United States Patent [19]

Häfner

[11] Patent Number: 4,830,399

[45] Date of Patent: May 16, 1989

[54] ELASTIC CONNECTION BETWEEN AT LEAST TWO RIGID PARTS

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 57,892

[22] PCT Filed: Sep. 25, 1986

[86] PCT No.: PCT/DE86/00395

§ 371 Date: May 21, 1987

§ 102(e) Date: Jul. 2, 1987

[87] PCT Pub. No.: WO87/02129

PCT Pub. Date: Apr. 9, 1987

[30] Foreign Application Priority Data

Sep. 25, 1985 [DE] Fed. Rep. of Germany ....... 3534211

[51] Int. Cl.⁴ .............................................. B60G 17/00
[52] U.S. Cl. .................................... 280/707; 280/716
[58] Field of Search .................................. 280/707, 716

[56] References Cited

U.S. PATENT DOCUMENTS

| 1,994,388 | 3/1935 | Erichsen | 73/862.62 |
| 3,035,853 | 5/1962 | Klein | 280/709 |
| 3,410,135 | 11/1968 | Reynaud | 73/862.32 |
| 3,582,691 | 6/1971 | Sonderegger et al. | 310/328 |
| 4,175,429 | 11/1979 | Keck | 73/862.68 |
| 4,386,791 | 6/1983 | Watanabe | 280/707 |

FOREIGN PATENT DOCUMENTS

| 0114757 | 8/1984 | European Pat. Off. . |
| 0145001 | 6/1985 | European Pat. Off. . |
| 0151421 | 8/1985 | European Pat. Off. . |
| 1902944 | 8/1970 | Fed. Rep. of Germany . |
| 3300640 | 7/1984 | Fed. Rep. of Germany . |
| 3502275 | 7/1986 | Fed. Rep. of Germany . |
| 516321 | 4/1921 | France . |
| 2126695 | 10/1972 | France . |
| 2545225 | 11/1984 | France . |
| 183137 | 10/1984 | Japan . |

Primary Examiner—Kenneth R. Rice
Attorney, Agent, or Firm—Armstrong, Nikaido, Marmelstein & Kubovcik

[57] ABSTRACT

Elastic connection between at least two rigid parts having provided an elastomeric material therebetween where in the connection at least one sensor is integrated which detects forces or moments acting at the connection. Such connections are advantageously built into apparatuses in particular vehicles and the determined forces and moments are used for controlling and monitoring.

26 Claims, 8 Drawing Sheets

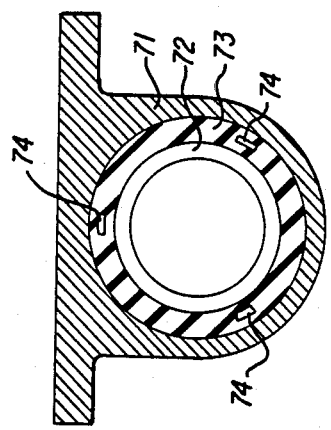
Fig. 11
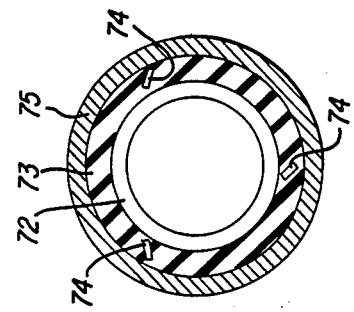
Fig. 14
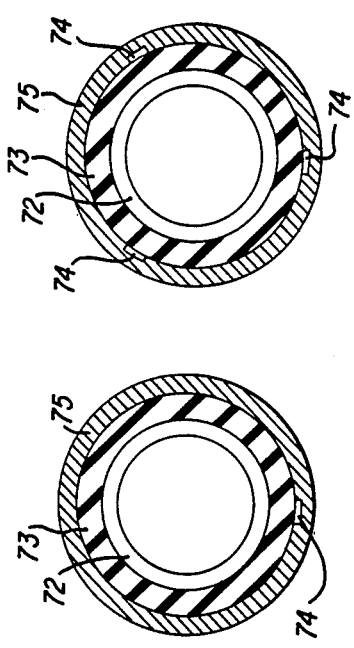
Fig. 13
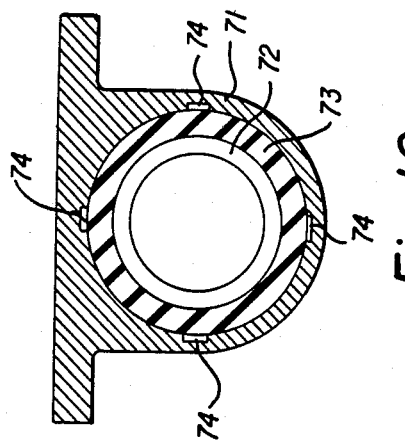
Fig. 10
Fig. 12

ELASTIC CONNECTION BETWEEN AT LEAST TWO RIGID PARTS

TECHNICAL FIELD

The invention relates to an elastic connection between at least two rigid parts having provided therebetween an elastomeric material.

BACKGROUND ART

There are numerous devices, apparatuses, and machines which are either elastically supported or parts and units thereof are connected with eachother by an elastic connection or linkage. Exemplary, such connections have become known under the name "rubber metal springs" or "ruber metal elements". With such apparatuses, machines, and devices there is often a desire for information about the condition and/or the operating states; for this purpose the determination of forces and/or moments acting upon the apparatuses, machines, and devices would be of advantage.

For example, the characteristics of a moving automotive vehicle are considerably influenced by the condition of the vehicle, the load and the forces acting upon the vehicle during movement. For known vehicles it has been tried, in time-consuming and cumbersome investigations during the developement period to find a compromise permitting acceptable driving characteristics for as many different situations as possible. Furthermore, it has become known to manually adjust the spring suspension of the vehicle dependent on a large or small load.

Furthermore, it has become known in connection with the use of telescopic air supports to provide a load-dependent electronic height regulation which regulates the clearance of the carbody above ground and maintains it in the horizontal position. For this purpose, an optical or inductive height sensor is secured to a spring support which sensor is connected to an electronic regulating circuitry which may be set onto one of several different positions. However, the known arrangement has only the purpose that the car body is adjusted to one of several selected clearances in a static state, i.e. when the vehicle is in rest.

However, during movement of the vehicle quite different situations exist depending on the velocity, the acceleration, deceleration, street condition and strength and direction of the wind. These different situations were taken into account insufficiently when designing the vehicle. The todays efforts to keep the $c_w$ value as low as possible, are an illusion when the car body, optimised for a horizontal position, inclines in forward or rearward direction in view of the forces (load-acceleration etc.) acting onto the vehicle.

Also, the steering geometry once selected and implemented, as well as the setting of the toe-in and the like have an optimum for a single situation only though in view of the centrifugal forces in bends and in view of side wind there may exist quite different situations.

The European Patent Application Publication No. 0162 604 discloses a dump truck which for determining the load weight is supported in a lowered position on force measuring cells. By evaluating pressure peaks the road condition and the tire condition may be determined during truck movement.

The European Patent Application Publication No. 151 421 relates to a motor car having two piezo-electric plates inserted as a vibration sensor into the suspension. Dependent on vibrations according to the street condition the suspension is set to "hard", "soft" or "medium".

The German Patent Application Publication No. 35 02 337 relates to a vehicle spring suspension; the fluid spring chambers supply and drain valves are controlled, dependent on a change in direction, by means of the angular velocity of the steering wheel and the vehicle speed.

The German Patent Specification No. 1902944 discloses an automotive vehicle preventing swerfing by controlling the break system, the accelerator and the wheel alignment (camber, spreading, spring hardness) by comparison with boundary values and using swivels, lateral acceleration and speed sensors.

The German Patent Application Publication No. 20 09 489 indicates how with a motor car movements or force changes of the chassis or the car body may be compensated by means of measuring elements and control devices.

According to the German Patent Application Publication No. 33 00 640 an additional steering is accomplished with an automotive vehicle dependent on control parameters as speed and lateral acceleration.

According to the German Patent Application Publication No. 30 13 114 the relative position of the car body of an automotive vehicle is determined relative to several vehicle axles by means of axle sensors and pressure sensitive pressure signal devices, namely a manometer.

According to the German Patent Specification No. 26 36 899 overloading of an automotive vehicle is indicated by means of loaddependent threshold switches.

According to the U.S. Pat. No. 3,035,853 the suspension of the car body at the chassis is stabilized by means of force measuring cells connected to the hydraulic cylinders of the suspension.

According to the German Patent Application Publication No. 32 36 080 a torque strain gauge is used for determining the torque acting at the steering shaft and for controlling the servo-sterring system.

The U.K. Patent Application Publication No. 20 79 701 shows an automotive vehicle having a slant compensation using a pendulum.

The German Patent Application Publication No. 30 16 338 dissloses a piezo-electric measuring cell mounted in a tire of an automotive vehicle using wireless transmission of the measuring values to a control device and for indicating the tire condition As far as sensors are provided in known automotive vehicles they are discrete elements which are separately mounted at appropriate positions of the vehicle by means of fixing devices for suitably securing them. Such designs are space and cost consuming.

Though the determination and use of measuring values for determining the condition and the operating state have been explained by referring to an automotive vehicle, a similar situation exists with many other apparatuses, machines and devices as stationary combustion machines, electric machines, tooling machines, construction machines, cranes and the like.

DISCLOSURE OF THE INVENTION

It is an essential object of the invention to provide an elastic connection between at least two rigid parts which connection permits a simple detection of forces and/or moments existing in the connection.

Furthermore, the connection shall be designed such that force or moment measurements may be performed by means of a compact and inexpensive means.

Furthermore, the invention relates to apparatuses, machines, and devices comprising means for simply measuring forces and/ or moments at at least some elastic connections between rigid parts.

The elastic connection between two rigid parts having elastomeric material provided therebetween is, according to the invention, characterized in that in the connection at least one sensor is integrated for detecting forces and/or moments existing in the connection.

Further features and advantages of the connection according to the invention as well as the application thereof with apparatuses, machines and devices are characterized in the subclaims.

BRIEF DESCRIPTION OF THE DRAWINGS

FIGS. 8-11 schematic sectional side views of embodiments of connections and bearing arrangements, respectively, as they exemplary may be used for torsion bars of motor cars having force measuring cells integrated therein;

FIGS. 12-14 schematic side views of connections between concentric rotational elements having force measuring cells integrated therein;

MODES FOR CARRYING OUT THE INVENTION

Figure 1:
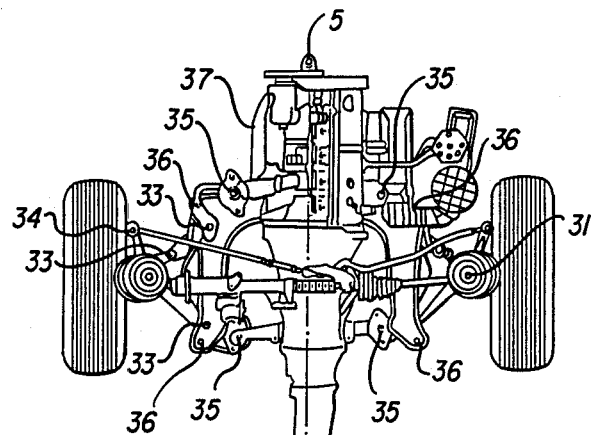
FIG. 1 is a schematic plan view onto an automotive vehicle adapted for performing an inventive method and provided with connections according to the invention.
Figure 1:
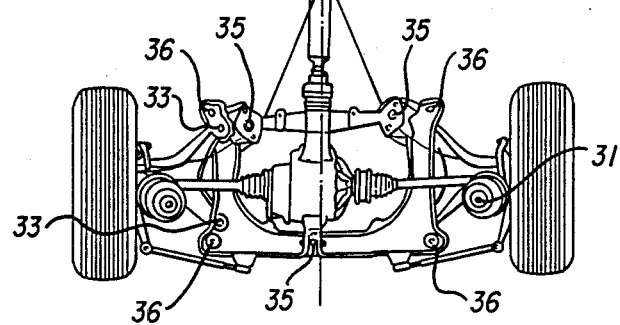
Figure 2:
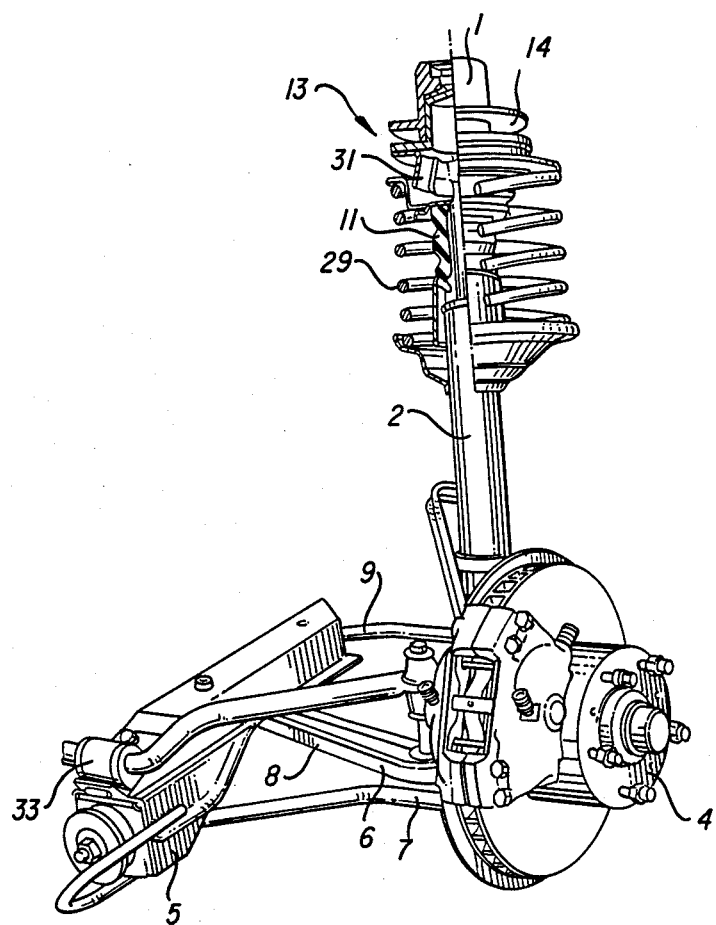
FIG. 2 is a perspective view of an exemplary provision of a wheel load measuring device in a spring leg of a motor car.
Figure 3:
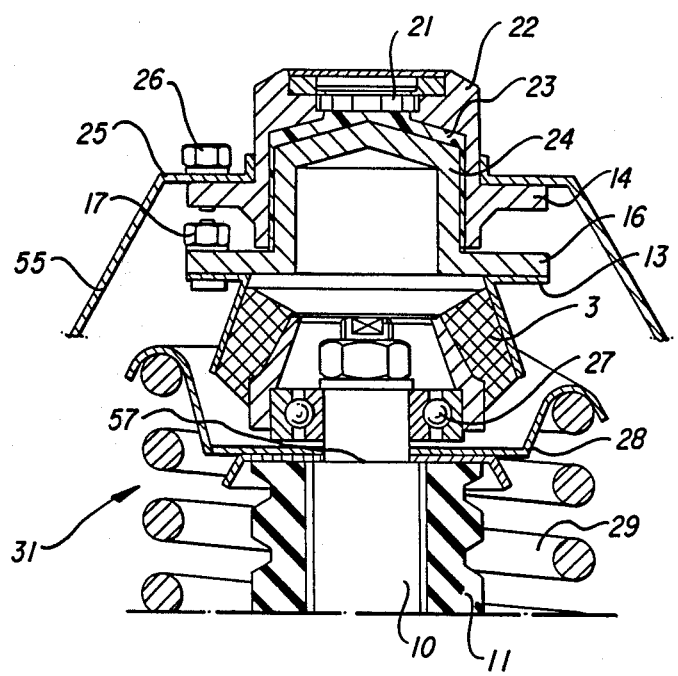
FIG. 3 a sectional view of an exemplary wheel load measuring device according to FIG. 2.
Figure 4:
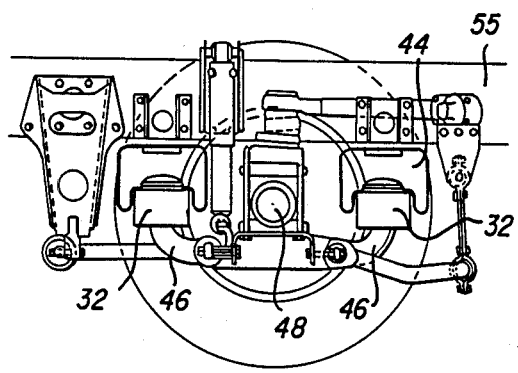
FIG. 4 a side view of a wheel suspension as it may exemplary be used with a rail vehicle or a truck.

FIG. 1 shows a plan view of a chassis of a motor car illustrating exemplary possibilities for providing force measuring cells. In particular there are shown:

force measuring cells 31 at the spring legs (viz. also FIGS. 2 and 3);

force measuring cells 32 between leaf springs or air springs and the car body (viz. FIG. 4);

force measuring cells 33 provided at the steering, guiding and torsion bar heads;

force measuring cells 34 at the toe-in bar heads;

force measuring cells 35 at the motor, transmission and differential bearings; and force measuring cells 36 at the chassis and gearing saddles at the front or rear of the car.

If required, further locations at which forces or moments may exist, may be provided with corresponding force measuring cells, in particular at a trailer coupling.

By means of the force measuring elements provided at the vehicle in particular the forces, driving and braking moments acting upon the wheels, the vehicle load, the forces and moments acting upon the steering system, as well as forces and moments acting upon the car body, the chassis and the transmission saddles may be measured directly.

Using these measured values the following parameters may be determined indirectly by means of data processors and by using stored and, if desired, changeable values.

Thus, on the basis of detected wheel forces, possibly in consideration of other parameters and stored values, the condition of the tires, in particular the concentric running, the balance and pressure may be determined. Furthermore, the directly measured values permit conclusions as to the road quality. The same is true for the conditions of the chassis and the shock absorbers. Furthermore important, is detecting of the slippage on the road, the torques of the wheels, exemplary in connection with antiblocking-systems.

For optimising the driving characteristics the wind resistance, the buoyancy forces acting from the front, from the rear and laterally onto the car body and lateral forces caused by the side wind may be determined and evaluated.

Force measuring cells 35 used in connection with the support of the motor may be used for determining the torque acting at the motor.

The values and parameters directly measured and derived therefrom respectively, are then used for a corresponding adjusting and/or regulating of various units of the car as well as for a further processing for information purposes.

For example, the suspension, attenuation and clearance above ground of the car may be automatically regulated for an optimisation of the driving characteristics. Furthermore, the influencing of the break and acceleration forces and the distribution of the driving energy onto the wheels is important, in particular, for all-wheel-drives and the antiblocking system, respectively. A steering regulation, exemplary in the form of an automatic change of the steering geometry, in particular the toe-in the steering and the steering point may automatically compensate side wind influences. Furthermore, regulating the tire pressure or at least an indication of the required tire-pressure may be considered. Also, influencing of the torque converter of an automatic shift gearing may be possible.

On the basis of the torque acting on the motor and, in addition, by using the rotational speed the actual effective power of the motor may be determined and used for optimising the operation of the motor (optimum torque), possibly, in connection with the torque converter of the automatic transmission gearing.

FIG. 2 shows an embodiment of the provision of a force measuring cell 31 (viz. also FIG. 1) in cooperation with a spring leg of a motor car for determining the wheel load. An upper flange 13 of a vibration metal bearing 3 of the spring leg 2 is connected to force meaasuring cell 31, which preferably is an elastostatic force measuring cell as disclosed in the European Patent Application Publication No. 145,001 (viz. also FIG. 3).

The wheel bearing 4 is horizontally guided from the chassis 5 via the levers 6 and 7, a torsion bar 8 and a steering bar 9. The influence of by-pass forces caused by the horizontal guidance, onto the wheel load measurement are compensated by a load dependent calibration.

FIG. 3 illustrates details of the mounting of the force measuring cell 31 in the spring leg 2.

The force measuring 31 of the preferred embodiment consists of two potlike elements, i.e. an outer pressure cylinder 22 and an inner load piston 24 nested in the cylinder 22, elastomeric material 23 being provided between these elements peripherally and between the bottom of the pressure cylinder 22 and the top face of the load piston 24. In pressure cylinder 22 a pressure transducer or sensor 21 is arranged which exemplary operates on a piezo-resistive basis. The pressure transducer 21 is inserted into the pressure cylinder 22 from the topside and, with its bottom side, it is contact to the elastomeric material. The car body 55 of the motor car has a flange 14, which exemplary is connected to a flange 25 formed at the pressure cylinder 22 by a corresponding screw connection 26.

On the other hand the load piston 24 is provided with a flange 16 secured to the flange 13 of the vibration metal bearing 3 of the spring leg 2 by means of a screw connection 17. At the upper end of a piston rod 10 extending into the vibration metal bearing 3 there is provided a groove ball bearing 27, which ensures a rotational movability between the spring leg and the force measuring cell. A projection 57 of the piston rod 10 supports a spring plate 28 engaging a spiral spring 29. The piston rod 10 is surrounded by a hollow rubber spring 11.

The weight of the car body 54 urges against the elastomeric material 23 provided between the pressure cylinder 28 and the load piston 24, which elastomeric material transmit this pressure to the pressure transducer 21 converting this pressure into an electric signal which is supplied to the evaluation unit. The wheel load may be determined with the car in rest either after or during the loading. This enables a determination of the added load by first determining the net-weight of the car body before loading and offering a continuous indication during loading. Such an arrangement may preferably be provided with trucks.

On the other hand, on the basis of the statically determined wheel load the suspension, attenuation ect. may be adjusted correspondingly. This allows to consider an asymmetric loading of the invididual wheels.

However, according to a further aspect of the present invention it is also possible, to determine the dynamic response of the forces exerted onto the wheel by continuous measurement during driving and to use this response for optimising the driving characteristics.

FIG. 4 illustrates the bearing and suspension of a wheel as it may be used in connection with a truck or a rail vehicle. In particular FIG. 4 shows force measuring elements 32 which may be similarly designed as force measuring element according to FIG. 3.

FIG. 4 shows the car body 55 resting on supporting elements 46 of the axle arrangement 48 by means of air springs 44 with interposed force measuring cells 32.

Figure 5:
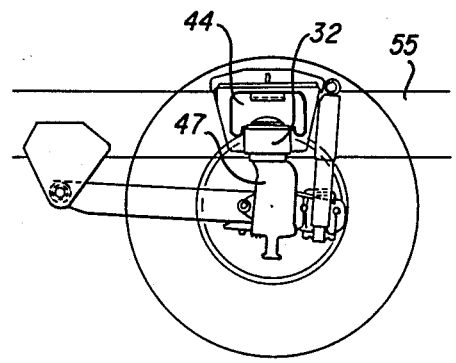
FIG. 5 a side view of a further embodiment of a wheel suspension having a force measuring cell integrated therein.

FIG. 5 shows an alternative embodiment for supporting the car body 55 by means of a hollow rubber/air spring 44 on a support element 47 engaging the wheel axle not shown in FIG. 5.

Figure 6:
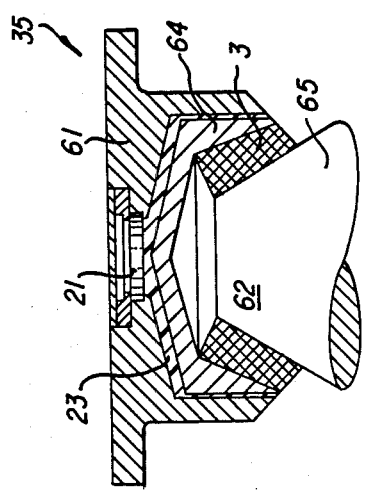
FIG. 6 a schematic sectional side view of a further embodiment of a wheel suspension having a force measuring cell integrated therein.

FIG. 6 shows an embodiment of the inventive connection further integrated as compared with the embodiment of FIG. 3; similar or corresponding parts are provided with the same reference numerals as in FIG. 3 and are not explained in further detail. It should be noted the omission of the flanges 13 and 16, respectively, and of the screw connection 17 and the considerable reduction in height of the arrangement.

With this embodiment the vibration metal bearing 3 is directly inserted in an inwardly tapered recess 63 of a pressure piston 64 which in turn is provided in a pressure cylinder 61 similar to the pressure cylinder 22. Thus, there is a complete integration of the force/moment measuring device resulting in low manufacturing efforts. Furthermore, the force/moment measuring device does not need any essential additional space.

Figure 7:
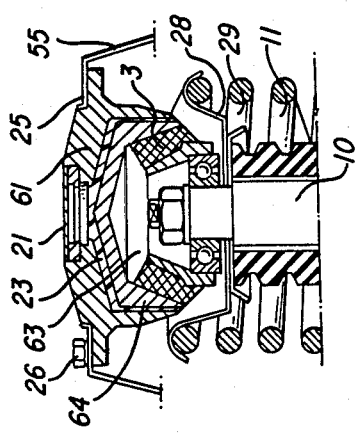
FIG. 7 a schematic sectional side view of an embodiment of a bearing arrangement having a force measuring cell integrated therein.

FIG. 7 shows an embodiment of the connection according to the invention as it may be used for a force measuring cell 35 for supporting the motor or the shift gearing, respectively. This embodiment is particularly simple since the connection is just a bearing support on a basis 65 of the chassis without any lateral securing. The more important is in this connection the complete integration of the force measuring cell in the elastic connection.

Figure 8:
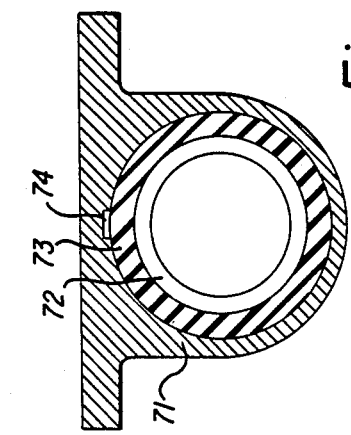

As with the embodiment of FIG. 6 the vibration bearing 3 is again provided in the interior of a tapered recess 63 of the pressure piston 64 which is arranged in the interior of the pressure cylinder 61. The latter may exemplary be secured to the motor 37 (FIG. 1) by means of screws. Again, in this connection there is no increase in height of the arrangement by interposing the force/torque measuring device. Housing the vibration metal bearing 3 in the interior of the pressure piston 64 results in a particularly simple mounting. FIG. 8 shows a further embodiment of the invention using an integrated force measuring cell 33 (viz. also FIGS. 1 and 2). Again, the complete integration of the force/moment measuring device in the connection joint should be noted. The torsion bar 8 (viz. also FIG. 2) is surrounded by elastomeric material 66 which in outward direction is bounded by the inner surface of a pressure cylinder 67 formed in the region of the torsion bar 8 and having a half-cylindrical shape. The half-cylindrical part 86 merges into a cylindrical section 69 whose longitudinal axis is orthogonal to the longitudinal axis of the torsion bar 8. A piston 70, fitted with its rear side to the rounding of the elastomeric material 66 is guided in the cylindrical section 69 and acts via the elastomeric material 23 onto the pressure transducer or sensor 21. The force vertically acting onto the torsion bar 8 is transmitted through the elastomeric material 66 to the piston 70 and from the latter through further elastomeric material to the sensor 21.

With the embodiments described above in particular an integrated force measuring cell according to European Patent Application Publication No. 145 001 has been used. Such a force measuring cell is particularly characterized in that between a cylindrical element and a piston guided therein there is formed a very narrow gap exemplary in the range of point 1 to 2 millimeters which gap is relatively high and completely filled with elastomeric material. Between the face surface of the piston and the bottom of the cylindrical element there is formed a space which is filled with elastomeric material. A pressure or force sensor is either embedded in the elastomeric material or is accessible from the exterior and, respectively, insertable in a wall of the cylindrical element such that in particular the force receiving surface of the pressure or force sensor is in engagement with the elastomeric material.

FIGS. 9 to 14 schematically show embodiments illustrating a further simplification and integration of the force measuring cell in the elastic connectin of two rigid parts.

In particular, with those embodiments the piston 70 (FIG. 8) is completely omitted which results in designs where a cylindrical element 72 is surrounded by a concentric space filled with elastomeric material 73 which space exemplary is formed in a flangeable element 71. This results in a bearing joint as it may exemplary be used for a torsion bar of a wheel suspension of a motor car. Alternatively, the element 72 may form a bearing in which an axle may rotate.

Figure 9:
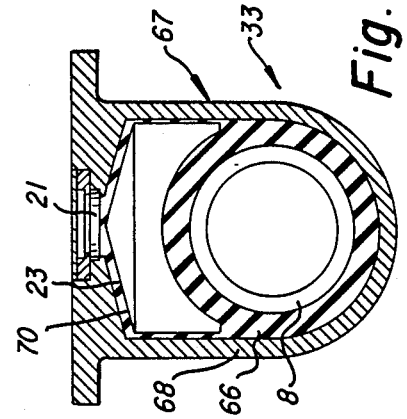

The embodiments according to the FIGS. 9 to 11 differ only by the different number and arrangement of pressure sensors. With the embodiments according to FIGS. 9 and 10 the pressure sensors are inserted into the cylindrical inner wall, the embodiment of FIG. 9 using one pressure sensor 74 only whilst the embodiment according to FIG. 10 using several, exemplary four pressure sensors indicating the load int he foru directions by means of corresponding electric signals.

With the embodiment of FIG. 11 the pressure sensors 74, specifically three pressure sensors 74, are embedded in the elastomeric material 73; thus, there is no need of mechanical tooling of the parts 71 and 72, respectively.

FIGS. 12 to 14 show embodiments similar to those of the FIGS. 9 to 11, however, using an outer rigid part formed as a tube 75 concentrically to the inner rigid part 72. The arrangement of the force measuring cells correspond to that of the embodiments of FIGS. 9 to 11.

Figure 15:
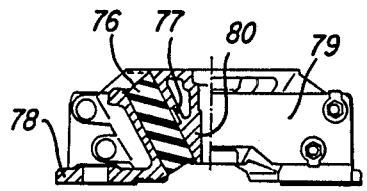
FIGS. 15 and 16 schematic sectional side views of further embodiments of connections using vibrational metal springs and having force measuring cells integrated thereto.
Figure 16:
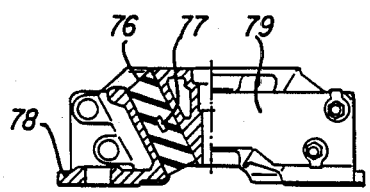

FIGS. 15 and 16 show embodiments using a conical or inclined, respectively, vibration metal spring by means of which a machine element 79 may be elastically supported in three dimensions which as known prevents the transmission of vibrations to frame 78. One or several force measuring cell(s) 77 may be embedded in the elastomeric material 76 or may be inserted at one of the contact surfaces of the machine element 79 or the frame 78, respectively, in the elastomeric material 76.

Figure 17:
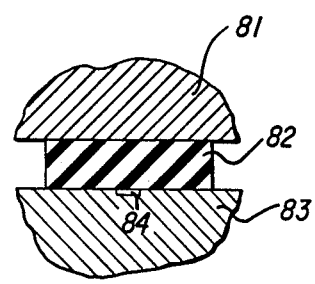
FIG. 17 a schematic sectional side view of a particularly simple embodiment of an elastic connection having a force measuring cell integrated therein.

FIG. 17 shows the simplest embodiment of an elastic connection using an integrated force measuring device where an upper rigid part 81 is elastically supported via a block of elastomeric material 82 on a base part 83. One or several pressure sensors 84 may be either embedded in the elastomeric block 82 or, however, are inserted in the contact surfaces of the parts 81 or 83, respectively to the elastomeric block 82.

It should be noted, that with the various embodiments the elastomeric material preferably is tightly connected, in particularly vulcanized with the contact surfaces of the rigid parts, engaging the material. This ensures a uniform transmission of the forces and moments acting onto the rigid parts. Even in mass production this results in connections which have a similar characteristic which may be predicted with high probability. Thus, the force or moment measurement may be performed without any cumbersome adjustment and with sufficient accuracy.

As explained before, with the integrated pressure sensors not only forces may be measured which exist in or at, respectively, the connection. Torques exerted onto the connection may be determined by a corresponding multiplication of the measured force components by the associated lever arms. However, by a corresponding arrangement and alignment of the pressure sensors torques may be directly determined, too. An example for such a connection is shown in FIG. 14 where the pressure sensors 74 are arranged exemplary at an angle of 45 degree in respect of the radial direction. With a fixedly mounted outer rigid cylinder element 75 the pressure sensors 74 measure a torque a moment exerted onto the inner element about the central longitudinal axis. Also, a radial arrangement of the pressure sensors is possible.

Figure 18:
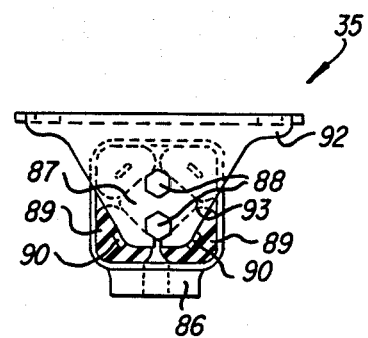
FIGS. 18 and 19 schematic side views of elastic connections with integrated measuring cells for directly detecting of torques.

FIG. 18 illustrates an embodiment of the connection according to the invention where in addition to force measurement the torque may be directly determined. A first rigid, fixedly mounted element 84 is provided with two spaced flanges 92 between which extends a rod 87 having a non-circular exemplary squared crosssection, the rod 87 being secured at its opposite faces exemplary by means of screws 88. A second rigid part 86 exemplary in the form of a lever is provided at its one end with a throughhole 93 surrounding the rod 87. The through-hole 93 preferably is also of a non-circular exemplary squared cross section the edges of the rod 87 being offset in respect of the edges of the through-hole 93 exemplary by 90 degree. The through-hole 93 is somewhat larger as the cross-section of the rod 87 the interspace between the surfaces of the rod 87 and the sides of the through-hole 93 being filled with cushions 94 made of elastomeric material and enclosing a pressure sensor 95. With the embodiment the pressure sensors 95 are aligned such that their pressure receiving surfaces extend in parallel to the surfaces of the rod 87. When a torque is exerted onto the lever 86 about the longitudinal axis of the rod 87 this torque may be determined directly by the sensors 95.

Figure 19:
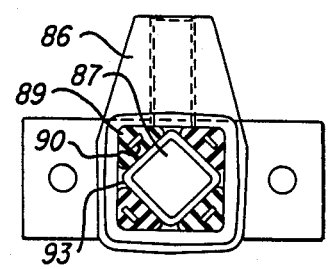

FIG. 19 shows a connection between a rigid fixedly arranged part 85 and a further rigid part 86. Again a rod 87 having preferably a squared cross section is used.

The cushions 94 correspond to those of FIG. 18.

It should be appreciated, that all connections have directly integrated force measuring devices which results in a particular advantageous arrangements in respect of cost and space.

Figure 20:
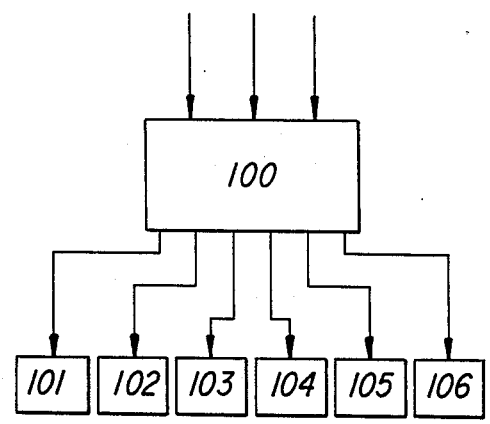
FIG. 20 a block diagram of a vehicle control system.

With a motor car according to FIG. 1 being provided with such elastic connections containing force/moment measuring devices the electrical signals supplied by the pressure sensors may be applied to a processor 100 representing the central processing unit of the control system illustrated in FIG. 20. A person skilled in the field of data processing is in the position to set up a corresponding program for the processor which generates on the basis of detected values, stored reference values and corresponding mathematical relations of the values to each other various control signals. In particular, a control signal may be issued from the processor 100 to a steering control circuit 101 by which signal the steering angle or the degree of servo-steering, respectively, the toe-in or the like may be influenced. A further control signal may be applied to a motor operating control circuit by which signal a control of fuel supply, the ignition time and the like may be accomplished. Also the processor 100 may apply further control signals to a suspension control circuit 103 by means of which the clearance of the car body above ground, as well as the degree of spring action of the individual wheel suspensions may be controlled dependent on the momentary load caused by the loading, the driving and the side wind as well as the cornering characteristics. A further control signal may be supplied to a break control circuit 104 controlling an antiblocking system. A further control signal may be applied to an emergency control unit 106 which initiates appropriate measures in case of emergency as inflating a protective air bag. Control signals supplied to an indicator control circuit 105 cause the initiation of corresponding indicator controls giving optical and accustical indications to the user of the vehicle.

For other apparatuses, machines and devices a corresponding control system may be designed by a person skilled in the art according to the individual requirements.

As regards the specific design and operation of the force/moment measuring devices integrated in the connections according to the embodiments it is referred to the European Patent Application Publication No. 145 001 the disclosure of which is completely declared to the contents of the present patent application. In particular, the material for the elastomeric material disclosed there may be used and the dimensional values indicated there are a basis for dimensioning the connections according to the invention. Also, the various types of sensors disclosed in this printed publication are adapted inter alia in connection with the present invention.

In connection with FIG. 8 it should be noted that those connections may represent force measuring cells 36 according to FIG. 1, too. The generally symetrical arrangement (left and right) of two connections permits the calculation of the torque between the two connections on the basis of the known distance thereof and using the forces detected by the pressure sensors.

I claim:

1. An elastic connection between at least a first and second rigid parts comprising:
    elastomeric material provided between said two rigid parts; and
    at least one sensor integrated in said elastic connection and embedded in said elastomeric material, said sensor being aligned in said elastomeric material such that said sensor responds to torques acting between said elastically connected first and second rigid parts.

2. The connection of claim 1 wherein said elastomeric material surrounds said second rigid part circumferentially and said at least one sensor is arranged at an oblique angle to a radial direction.

3. An apparatus having at least two of a plurality of rigid parts elastically connected with each other comprising:
    elastomeric material provided in connecting joints bewteen said at least two rigid parts;
    at least one sensor integrated in said connecting joints for determining forces and/or moments respectively acting at said connecting joints and generating signals representing said forces and/or moments; and
    processing and controlling means for said apparatus connected to said at least one sensor and having said signals applied thereto.

4. The connection of claim 3 designed as a vibration metal element said elastomer material strongly adhering two surfaces of said first and second rigid parts.

5. The connection of claim 3 wherein a joint between said first and second parts is formed as an essentially closed space filled with said elastomeric material.

6. The connection of claim 5 wherein said space is formed essentially only within one of said first and second parts.

7. The connection of claim 5 wherein said space is formed by surfaces of both of said at least first and second rigid parts.

8. The connection of claim 5 wherein said first rigid part is provided with a cylindrical recess into which a piston is inserted forming a narrow cylindrical gap said piston being influenced by a pressure exerted on said second rigid part.

9. The connection of claim 3 wherein said at least one sensor is in surface contact with said elastomeric material.

10. The connection of claim 3 wherein at least one said first rigid part surrounds at least one said second rigid part with interposement of said elastomeric material therebetween.

11. The connection of claim 10 wherein said first and second parts are arranged concentrically to each other forming cylindrical interspaces filled with said elastomeric material.

12. The connection of claim 3 wherein said at least first rigid part is concentrically interconnected in said second rigid part said first and second rigid parts having a non-circular peripheral form and said at least one sensor is arranged in said elastomeric material provided between said first and second parts with such an alignment that it determines torques acting between said first and second parts.

13. The vehicle of claim 3 wherein a plurality of said elastic connecting joints each having at least one said sensor integrated therein are arranged within said apparatus in spaced relationship to each other for determining moments acting onto said apparatus.

14. An automotive vehicle having a plurality of operational units, each operational unit having at least two of plurality of rigid parts elastically connected with each other comprising:
    elastomeric material provided in connecting joints between said at least two rigid parts;
    at least one sensor integrated in said connecting joints for determining forces and/or moments respectively acting at said connecting joints and generating signals representing said forces and/or moments; and
    processing and controlling means for said automotive vehicle connected to the sensors of said plurality of operational units and having said signals of said sensors of said plurality of operational units applied thereto.

15. The vehicle of claim 14 wherein said elastic connecting joints are integrated into spring legs of said automotive vehicle.

16. The vehicle of claim 14 wherein said elastic connecting joints are integrated into bearing positions of said automotive vehicle.

17. A method of operating an apparatus in dependence on forces and/or moments acting thereon comprising the steps of;
    integrating force/moment measuring devices into elastic connections and/or elastic support positions, respectively,
    determining the forces and/or moments acting upon the apparatus or parts thereof, respectively, by means of the force/moment measuring devices integrated into the elastic connections and/or elastic support positions; and processing the values determined by means of the force/moment measuring devices.

18. The method of claim 17 wherein said apparatus is an automotive vehicle and forces and/or moments acting on at least one part of the vehicle, as the vehicle wheels, steering system, the car body, the motor, the transmission gearing and/or the differential during driving are determined and are used for adjusting and/or controlling the suspension, attenuation, clearance above ground, steering, acceleration and/or breaking forces, power and the like.

19. The method of claim 18, wherein that during driving the vehicle the dynamic response of individual parts of the vehicle in comparison to ech other and/or to stored reference values are evaluated for optimizing the driving characteristics the vehicle.

20. The method of claim 18, wherein the tire condition and/or tire pressure, respectively, is controlled by comparing the dynamic response of the wheels and/or the axles, respectively, to each other and/or by comparing with stored reference values.

21. The method of any of the claims 18, wherein the condition of the shock absorbers are controlled by comparing the dynamic response of wheels and/or the axles to each other and/or with stored reference values, respectively.

22. The method of claim 18, wherein forces and/or moments acting on the vehicle laterally to the driving direction are determined and are used for controlling the suspension, attenuation, steering, clearance above ground, acceleration and/or breaking force.

23. The method of calim 18 wherein characterized in that forces and/or moments on the vehicle during driving, in view of acceleration and/or deceleration are determined and are used for controlling the suspension, attenuation, steering, clearance above ground, acceleration and/or breaking force.

24. The method of claim 18, wherein upon detecting the exceeding of an upper threshold of the deceleration emergency measures, as activating an inflatable airbar are initiated.

25. The method of claim 18, wherein in that continuously, upon request and/or at danger information about the condition of the vehicle and/or the road, if desired, including measures to be initiated is issued optically and/or accoustically.

26. An elastic connection between at least a first and second rigid parts comprising:

elastomeric material provided between said two rigid parts; and at least one sensor integrated in said elastic connection, said at least first of said rigid part of said first and second rigid parts being concentrically interconnected in said second rigid part of said first and second rigid parts and having a non-circular peripheral form and said at least one sensor is arranged in said elastomeric material provided between said first and second rigid parts with such an alignment that said sensor is responsive to torques acting between said first and second rigid parts.

* * * * *